US011415853B2

(12) United States Patent
Fang et al.

(10) Patent No.: US 11,415,853 B2
(45) Date of Patent: Aug. 16, 2022

(54) ARRAY SUBSTRATE AND DISPLAY PANEL

(71) Applicant: Shenzhen China Star Optoelectronics Semiconductor Display Technology Co., Ltd., Shenzhen (CN)

(72) Inventors: Shaomao Fang, Shenzhen (CN); Ilgon Kim, Shenzhen (CN); Bin Zhao, Shenzhen (CN); Xin Zhang, Shenzhen (CN); Jun Zhao, Shenzhen (CN)

(73) Assignee: Shenzhen China Star Optoelectronics Semiconductor Display Technology Co., Ltd., Shenzhen (CN)

( * ) Notice: Subject to any disclaimer, the term of this patent is extended or adjusted under 35 U.S.C. 154(b) by 197 days.

(21) Appl. No.: 16/767,142

(22) PCT Filed: Apr. 21, 2020

(86) PCT No.: PCT/CN2020/085906
§ 371 (c)(1),
(2) Date: May 27, 2020

(87) PCT Pub. No.: WO2021/189573
PCT Pub. Date: Sep. 30, 2021

(65) Prior Publication Data
US 2022/0121075 A1    Apr. 21, 2022

(30) Foreign Application Priority Data
Mar. 22, 2020 (CN) .......................... 202010204859.X

(51) Int. Cl.
*G02F 1/1343* (2006.01)
*G02F 1/1362* (2006.01)
*G02F 1/1335* (2006.01)

(52) U.S. Cl.
CPC .. *G02F 1/136295* (2021.01); *G02F 1/133514* (2013.01); *G02F 1/134309* (2013.01); *G02F 1/136286* (2013.01)

(58) Field of Classification Search
CPC ............. G02F 1/1333; G02F 1/133345; G02F 1/1343; G02F 1/134309; G02F 1/1335; G02F 1/133514; G02F 1/1362; G02F 1/136295
See application file for complete search history.

(56) References Cited

U.S. PATENT DOCUMENTS

2009/0290080 A1   11/2009   Horiuchi et al.
2010/0073273 A1    3/2010   Nam et al.

FOREIGN PATENT DOCUMENTS

| CN | 1834761 | 9/2006 |
|---|---|---|
| CN | 101410882 | 4/2009 |
| CN | 101685230 | 3/2010 |
| CN | 104267551 | 1/2015 |
| CN | 108020970 | 5/2018 |
| JP | 2002-250937 | 9/2002 |
| KR | 10-2004-0076721 | 9/2004 |

*Primary Examiner* — Thoi V Duong

(57) ABSTRACT

An array substrate and a display panel are provided. In the array substrate, the first data line is electrically connected to a blue pixel electrode, the second data line is electrically connected to a non-blue pixel electrode. A first horizontal distance is defined as a distance between the blue pixel electrode and the first data line electrically connected thereto, and a second horizontal distance is defined as a distance between the non-blue pixel electrode and an adjacent data line, or a distance between the blue pixel electrode and an adjacent second data line. The first horizontal distance is greater than the second horizontal distance.

10 Claims, 2 Drawing Sheets

ARRAY SUBSTRATE AND DISPLAY PANEL

RELATED APPLICATIONS

This application is a National Phase of PCT Patent Application No. PCT/CN2020/085906 having International filing date of Apr. 21, 2020, which claims the benefit of priority of Chinese Patent Application No. 202010204859.X filed on Mar. 22, 2020. The contents of the above applications are all incorporated by reference as if fully set forth herein in their entirety.

FIELD AND BACKGROUND OF THE INVENTION

The present application relates to the field of display technology, in particular to an array substrate and a display panel.

In current 1-gate 1-data architecture (sub-pixels in the same row are connected to the same scanning line, and sub-pixels in the same column are connected to the same data line) 8K (resolution: 7680*4320) display panels, limited space creates tight tolerances between a data line and a pixel electrode, resulting in a greater coupling capacitance between the data line and the pixel electrode. However, as panels need to turn on their white balance during a test stage, most of them need to decrease their scale of blue pixels. Therefore, when displaying a white frame on a gray background, a coupling asymmetry of the left and right data lines results in vertical crosstalk, and the greater the capacitance of the data line and the pixel electrode, the more severe the effect.

Embodiments of the present application provide an array substrate and a display panel to solve the technical problem of causing a coupling asymmetry of the left and right data lines and the vertical crosstalk when decreasing the scale of blue pixels in the white balance test stage.

SUMMARY OF THE INVENTION

An embodiment of the present application provides an array substrate, including: a substrate; a plurality of data lines, the plurality of data lines disposed on the substrate, and the plurality of data lines including a first data line and a second data line; and a plurality of pixel electrodes, the plurality of pixel electrodes disposed on the plurality of data lines, the data lines alternately disposed with the pixel electrodes, and the plurality of pixel electrodes including a blue pixel electrode and a non-blue pixel electrode; the first data line is electrically connected to the blue pixel electrode; the second data line is electrically connected to the non-blue pixel electrode; there is a first horizontal distance between the blue pixel electrode and the first data line electrically connected thereto, there is a second horizontal distance between the non-blue pixel electrode and a data line adjacent thereto or there is a second horizontal distance between the blue pixel electrode and the second data line adjacent thereto; the first horizontal distance is greater than the second horizontal distance.

The non-blue pixel electrode is a red pixel electrode or a green pixel electrode; the plurality of data lines further includes a third data line, the second data line is electrically connected to one of the red pixel electrode or the green pixel electrode, and the third data line is electrically connected to the other one of the red pixel electrode or the green pixel electrode.

A difference between the first horizontal distance and the second horizontal distance is between 0.1 μm and 1 μm.

In the array substrate of the embodiment of the present application, the material of the data line includes one of metal, metal alloy or metal oxide.

In the array substrate of the embodiment of the present application, the array substrate further includes an interlayer dielectric layer disposed between the plurality of data lines and the plurality of pixel electrodes.

An embodiment of the present application further provides an array substrate, including: a substrate; a plurality of data lines, the plurality of data lines being disposed on the substrate, and the plurality of data lines comprising a first data line and a second data line; and a plurality of pixel electrodes, the plurality of pixel electrodes disposed on the plurality of data lines, the data lines alternately disposed with the pixel electrodes, and the plurality of pixel electrodes including a blue pixel electrode and a non-blue pixel electrode; the first data line is electrically connected to the blue pixel electrode; the second data line is electrically connected to the non-blue pixel electrode; there is a first horizontal distance between the blue pixel electrode and the first data line electrically connected thereto, and there is a second horizontal distance between the non-blue pixel electrode and a data line adjacent thereto or there is a second horizontal distance between the blue pixel electrode and the second data line adjacent thereto; and the first horizontal distance is greater than the second horizontal distance.

In the array substrate of the embodiment of the present application, the non-blue pixel electrode is a red pixel electrode or a green pixel electrode. The plurality of data lines further includes a third data line, and the second data line is electrically connected to one of the red pixel electrode or the green pixel electrode, and the third data line is electrically connected to the other one of the green pixel electrode or the red pixel electrode.

In the array substrate of the embodiment of the present application, the difference between the first horizontal distance and the second horizontal distance is between 0.1 μm and 1 μm.

In the array substrate of the embodiment of the present application, the material of the data line includes one of metal, metal alloy or metal oxide.

In the array substrate of the embodiment of the present application, the array substrate further includes an interlayer dielectric layer, the interlayer dielectric layer is disposed between the plurality of data lines and the plurality of pixel electrodes.

The present application further relates to a display panel, which includes an array substrate, a color filter substrate, and a liquid crystal disposed between the array substrate and the color filter substrate. The array substrate includes: a substrate; a plurality of data lines, the plurality of data lines disposed on the substrate, and the plurality of data lines including a first data line and a second data line; and a plurality of pixel electrodes, the plurality of pixel electrodes disposed on the plurality of data lines, the data lines alternately disposed with the pixel electrodes, and the plurality of pixel electrodes including a blue pixel electrode and a non-blue pixel electrode; the first data line is electrically connected to the blue pixel electrode; the second data line is electrically connected to the non-blue pixel electrode; there is a first horizontal distance between the blue pixel electrode and the first data line electrically connected thereto, and there is a second horizontal distance between the non-blue pixel electrode and a data line adjacent thereto or there is a second horizontal distance between the blue pixel electrode and the second data line adjacent thereto; and the first horizontal distance is greater than the second horizontal distance.

In the display panel of the embodiment of the present application, the non-blue pixel electrode is a red pixel electrode or a green pixel electrode; the plurality of data lines further includes a third data line, and the second data line is electrically connected to one of the red pixel electrode or the green pixel electrode, and the third data line is electrically connected to the other one of the green pixel electrode or the red pixel electrode.

In the display panel of the embodiment of the present application, the difference between the first horizontal distance and the second horizontal distance is between 0.1 μm and 1 μm.

In the display panel of the embodiment of the present application, the material of the data line includes one of metal, metal alloy or metal oxide.

In the display panel of the embodiment of the present application, the array substrate further includes an interlayer dielectric layer, the interlayer dielectric layer is disposed between the plurality of data lines and the plurality of pixel electrodes.

Beneficial Effect

In an array substrate and a display panel of this application, the first horizontal distance between the blue pixel electrode corresponding to the blue pixel and the first data line electrically connected thereto is set to be greater than the second horizontal distance between the non-blue pixel electrode and the data line adjacent thereto. In this setting, when the pixel is located on an initial side where scanning is performed, assuming that the blue pixel is in the positive frame, a voltage of the blue pixel will be coupled and brightened by its first data line and coupled and brightened by the second data line (negative frame). The blue pixel is further away from its first data line, the capacitance is less, and the coupling is proportional to the capacitance, so the brightness of its blue pixel is reduced. The white balance itself can reduce the voltage of the first data line of the blue pixel itself, thereby reducing its brightness to adjust the color temperature. Therefore, this application reduces the blue brightness without changing the voltage of the first data line of the blue pixel to ensure that the voltages of all data lines are consistent, which not only achieves the effect of its white balance but also does not cause vertical crosstalk due to the inconsistency of the data lines voltages.

BRIEF DESCRIPTION OF THE SEVERAL VIEWS OF THE DRAWINGS

In order to more clearly explain the embodiments of the present application or the technical solutions in the prior art, the following briefly introduces the drawings required in the embodiments. The drawings in the following description are only some embodiments of the present application. For those of ordinary skill in the art, without doing any creative work, other drawings can also be obtained based on these drawings.

DESCRIPTION OF SPECIFIC EMBODIMENTS OF THE INVENTION

Figure 1:
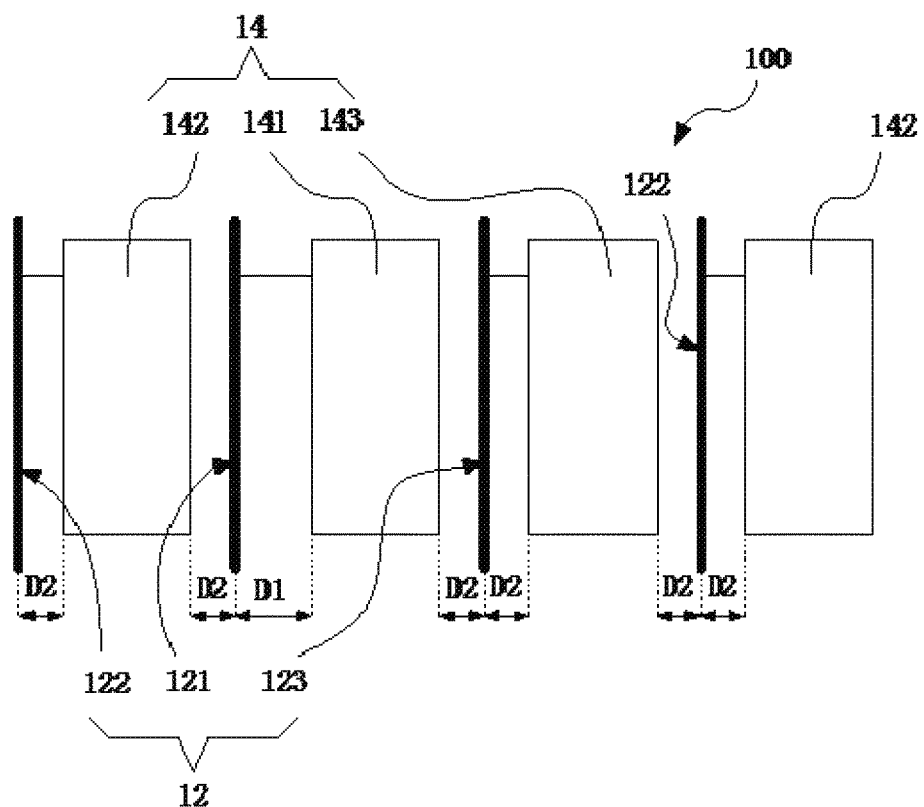
FIG. 1 is a schematic structural plan view of an array substrate of an embodiment of the present application.

The technical solutions in the embodiments of the present application will be described clearly and completely with reference to the drawings in the embodiments of the present application. Obviously, the embodiments are only a part of the embodiments of the present application, but not all the embodiments. Based on the embodiments in the present application, all other embodiments obtained by those skilled in the art without doing creative work fall within the protection scope of the present application.

In the description of this application, it should be understood that the orientation or positional relationship indicated by the terms "center", "longitudinal", "lateral", "length", "width", "thickness", "above", "below", "front", "back", "left", "right", "vertical" straight, "horizontal", "top", "bottom", "inner", "outer", "clockwise", "counterclockwise", etc. are based on the orientation or positional relationship shown in the drawings. They are only for the convenience of describing the present application and simplifying the description, rather than indicating or implying that the device or element referred to must have a specific orientation, be constructed and operate in a specific orientation, and therefore cannot be construed as a limitation of the present application. In addition, the terms "first" and "second" are used for description purposes only, and cannot be understood as indicating or implying relative importance or implicitly indicating the number of technical features indicated. Therefore, the features defined as "first" and "second" may explicitly or implicitly include one or more of the features. In the description of this application, the meaning of "plurality" is two or more, unless otherwise specifically limited.

In the description of this application, it should be noted that the terms "installation", "connect to" and "connection" should be understood in a broad sense, unless otherwise clearly specified and limited. For example, it can be a fixed connection, a detachable connection, or an integral connection. It can be a mechanical connection, an electrical connection or can communicate with each other. It can be directly connected or indirectly connected through an intermediate medium. It can be a connection between two elements or an interaction between two elements. Those of ordinary skill in the art can understand the specific meanings of the terms in the application according to specific situations.

In this application, unless clearly specified and defined otherwise, the first feature is "above" or "below" the second feature, includes that the first feature and the second feature in direct contact, or includes that the first feature and the second feature are not in direct contact but are in contact with another feature between them. Moreover, the first feature is "above", "on" and "upside" the second feature includes that the first feature is directly above and diagonally above the second feature, or simply means that the first feature is higher in level than the second feature. The first feature is "below", "under" and "beneath" the second feature includes that the first feature is directly below and obliquely below the second feature, or simply means that the first feature is less in level than the second feature.

The following disclosure provides various embodiments or examples for implementing different structures of the present application. In order to simplify the disclosure of the present application, the components and settings of specific examples are described below. Certainly, they are only examples, and the purpose is not to limit this application.

Moreover, the present application may repeat reference numerals and/or reference letters in different examples. Such repetition is for simplicity and clarity, and does not indicate the relationship between the various embodiments and/or settings discussed. In addition, the present application provides examples of various specific processes and materials, but those of ordinary skill in the art may be aware of the application of other processes and/or the use of other materials.

Figure 2:
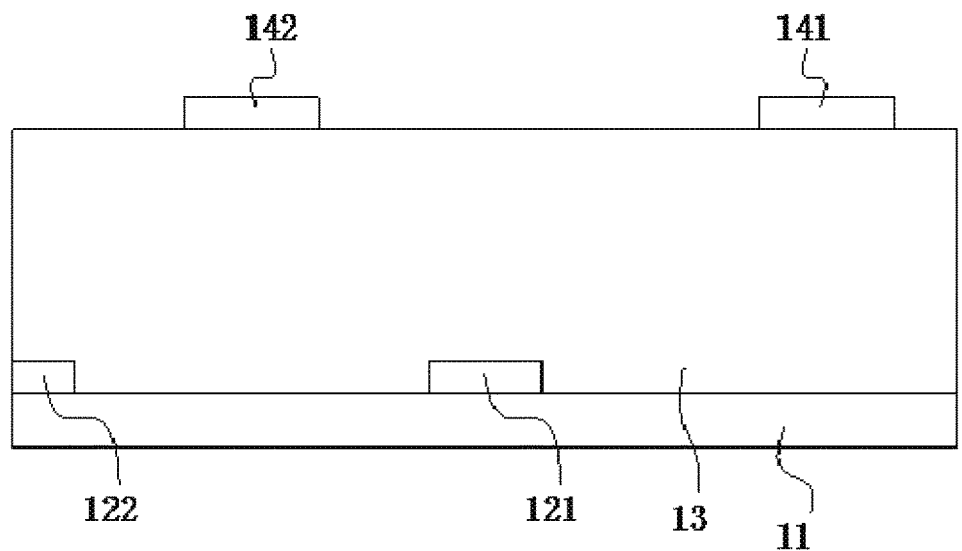
FIG. 2 is a schematic cross-sectional structural diagram of an array substrate according to an embodiment of the present application.

Please refer to FIG. 1 and FIG. 2. FIG. 1 is a schematic top view of an array substrate according to an embodiment of the present application. FIG. 2 is a schematic cross-sectional structural diagram of an array substrate according to an embodiment of the present application.

An embodiment of the present application provides an array substrate 100, which includes a base 11, a plurality of data lines 12, an interlayer dielectric layer 13, and a pixel electrode 14 arranged in sequence.

Specifically, the base 11 may be a substrate, such as a glass substrate, a plastic substrate, or a device board composed of a substrate, a thin film transistor, a scanning line, an insulating layer, and the like. A plurality of data lines 12 is disposed on the base 11. The plurality of data lines 12 includes a first data line 121 and a second data line 122. A plurality of pixel electrodes 14 are disposed on the plurality of data lines 12. The data lines 12 and the pixel electrodes 14 are alternately arranged. The plurality of pixel electrodes 14 includes a blue pixel electrode 141 and a non-blue pixel electrode.

The non-blue pixel electrode is a red pixel electrode 142 or a green pixel electrode 143. The plurality of data lines 12 further includes a plurality of third data lines 123, the second data line 122 is electrically connected to one of the red pixel electrode 142 or the green pixel electrode 143, and the third data line 123 is electrically connected to the other of the green pixel electrode 143 or the red pixel electrode 142. That is, if the second data line 122 is electrically connected to the red pixel electrode 142, the third data line 123 is electrically connected to the green pixel electrode 143.

The first data line 121 is electrically connected to the blue pixel electrode 141. There is a first horizontal distance D1 between the blue pixel electrode 141 and the first data line 121 electrically connected thereto. There is a second horizontal distance D2 between the non-blue pixel electrode and the data line 12 adjacent thereto. Also, there is a second horizontal distance D2 between the blue pixel electrode 141 and the second data line 121 adjacent thereto. The first horizontal distance D1 is greater than the second horizontal distance D2.

In the first embodiment, the second horizontal distance D2 between the non-blue pixel electrode and the data line 12 adjacent thereto includes three cases, which are as follows: there is a second horizontal distance D2 between the non-blue pixel electrode and the first data line 121 adjacent thereto, there is a second horizontal distance D2 between the non-blue pixel electrode and the second data line 122 adjacent thereto, and there is a second horizontal distance D2 between the non-blue pixel electrode and the third data line 123 adjacent thereto.

In addition, capacitive coupling is based on the premise that there is no power exchange: if the voltage at one end changes, the voltage at the other end will increase accordingly. The amount of voltage increase is proportional to the capacitance of the two.

In the array substrate 100 of the first embodiment of the present application, a first horizontal distance D1 between the blue pixel electrode 141 and the first data line 121 electrically connected thereto is set to be greater than the second horizontal distance D2 between the non-blue pixel electrode and the data line 12 adjacent thereto. In this setting, when the pixel is on the initial side where the scanning is performed, assuming that the blue pixel is in the positive frame, the voltage of the blue pixel electrode 141 will be coupled and brightened by its own first data line 121 and will be brightened by the coupling of the second data line 122 (negative frame). The blue pixel electrode 141 is further away from its first data line 121, so the capacitance is smaller. The coupling is proportional to the capacitance, so the brightness of its blue pixel is reduced, and the white balance reduces the voltage of the first data line 121 of the blue pixel electrode 141 itself, thereby reducing its brightness to adjust the color temperature.

Therefore, the design for reducing the blue brightness of the present application does not need to change the voltage of the first data line 121 of the blue pixel electrode 141 itself, to ensure that the voltage of all data lines 12 is consistent, not only to achieve its own white balance effect but also will not cause vertical crosstalk due to the inconsistent voltage of the data line 12.

Alternatively, the difference between the first horizontal distance D1 and the second horizontal distance D2 is between 0.1 μm (including 0.1 μm) and 1 μm (including 1 μm). Further, the distance difference between the first horizontal distance D1 and the second horizontal distance D2 is one of 0.2 μm, 0.3 μm, 0.4 μm, 0.5 μm, 0.6 μm, 0.7 μm, 0.8 μm, and 0.9 μm.

Alternatively, the material of the data line 12 is one or a combination of metal, metal alloy, or metal oxide. Further, the data line 12 has a multi-layer structure. Specifically, the data line 12 includes a metal layer and a metal alloy layer arranged in sequence, wherein the activity of the metal alloy layer is greater than that of the metal layer. When the data line 12 is wet-etched, the etching speed of the metal alloy layer is guaranteed to be faster than that of the metal layer, thereby avoiding an undercut phenomenon of the data line 12.

In the array substrate 100 of the embodiment of the present application, an area of a side of the first data line 121 facing the pixel electrode 14 is smaller than an area of a side of the second data line 122 facing the pixel electrode 14. Such an arrangement further reduces the capacitance value between the blue pixel electrode 141 and the first data line 121.

Figure 3:
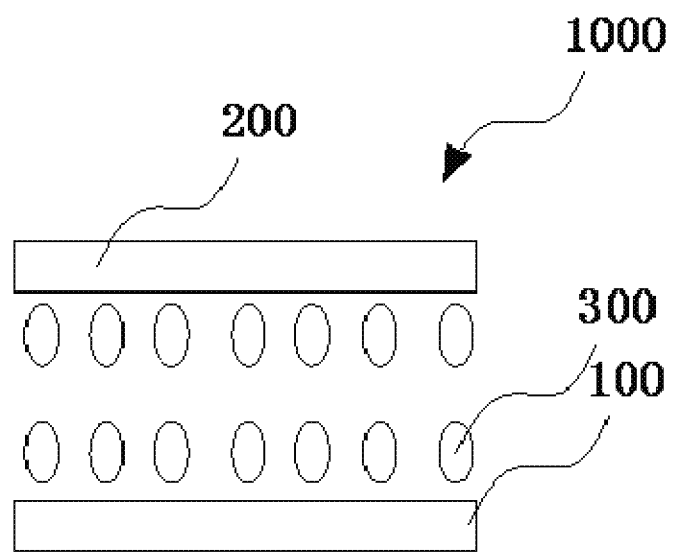
FIG. 3 is a schematic structural diagram of a display panel according to an embodiment of the present application.

Please refer to FIG. 3, the present application further relates to a display panel 1000, including an array substrate 100, a color filter substrate 200, and a liquid crystal 300 disposed between the array substrate 100 and the color filter substrate 200. The array substrate 100 includes: a substrate; a plurality of data lines, the plurality of data lines being disposed on the substrate, and the plurality of data lines including a first data line; and a plurality of pixel electrodes, the plurality of pixel electrodes being disposed on the plurality of data lines, the data lines being alternately disposed with the pixel electrodes, and the plurality of pixel electrodes including a blue pixel electrode and a non-blue pixel electrode; the first data line is electrically connected to the blue pixel electrode; there is a first horizontal distance between the blue pixel electrode and the first data line electrically connected thereto, there is a second horizontal distance between the non-blue pixel electrode and the data line adjacent thereto, and the first horizontal distance is greater than the second horizontal distance.

In the display panel of the embodiment of the present application, the non-blue pixel electrode is a red pixel electrode or a green pixel electrode. The plurality of data lines further includes a third data line, the second data line is electrically connected to one of the red pixel electrode or the green pixel electrode, the third data line is electrically connected to the other of the green pixel electrode or the red pixel electrode.

The structure of the array substrate of the display panel in the embodiment of the present application is the same as or is similar to the structure of the array substrate 100 of the above-mentioned embodiment, and will not be repeated here.

In an array substrate and a display panel of this application, the first horizontal distance between the blue pixel electrode corresponding to the blue pixel and the first data line electrically connected thereto is set to be greater than the second horizontal distance between the non-blue pixel electrode and the data line adjacent thereto. In this setting, when the pixel is located on an initial side where scanning is performed, assuming that the blue pixel is in the positive frame, a voltage of the blue pixel will be coupled and brightened by its first data line and coupled and brightened by the second data line (negative frame). The blue pixel is further away from its first data line, so the capacitance is less. In addition, the coupling is proportional to the capacitance, so the brightness of its blue pixel is reduced. The white balance itself can reduce the voltage of the first data line of the blue pixel itself, thereby reducing its brightness to adjust the color temperature. Therefore, this application reduces the blue brightness without changing the voltage of the first data line of the blue pixel to ensure that the voltages in all data lines are consistent, which not only achieves the effect of white balance, but also does not cause vertical crosstalk due to the inconsistency of the data lines voltages.

The array substrate and display panel provided by the embodiments of the present application have been described in detail above, and specific examples have been used in this article to explain the principles and implementation of the present application. The descriptions of the embodiments are only used to help understand the technical solutions and core ideas of the present application. Those of ordinary skill in the art should understand that they can still modify the technical solutions described in the foregoing embodiments, or equivalently substitute some of the technical features. However, these modifications or substitutions do not deviate from the scope of the technical solutions of the embodiments of the present application.

What is claimed is:

1. An array substrate, comprising:
   a substrate;
   a plurality of data lines, the plurality of data lines disposed on the substrate, and the plurality of data lines comprising a first data line and a second data line; and
   a plurality of pixel electrodes, the plurality of pixel electrodes disposed on the plurality of data lines, the data lines alternately disposed with the pixel electrodes, and the plurality of pixel electrodes comprising a blue pixel electrode and a non-blue pixel electrode;
   wherein the first data line is electrically connected to the blue pixel electrode, the second data line is electrically connected to the non-blue pixel electrode;
   wherein a first horizontal distance is defined as a distance between the blue pixel electrode and the first data line electrically connected thereto, a second horizontal distance is defined as a distance between the non-blue pixel electrode and an adjacent data line or a distance between the blue pixel electrode and an adjacent second data line; the first horizontal distance is greater than the second horizontal distance;
   wherein a difference between the first horizontal distance and the second horizontal distance is between 0.1 µm and 1 µm; and
   wherein the non-blue pixel electrode is a red pixel electrode or a green pixel electrode, the plurality of data lines further comprises a third data line, the second data line is electrically connected to one of the red pixel electrode or the green pixel electrode, and the third data line is electrically connected to the other one of the red pixel electrode or the green pixel electrode.

2. The array substrate according to claim 1, wherein a material of the data lines comprises one of metal, metal alloy or metal oxide.

3. The array substrate according to claim 1, wherein the array substrate further comprises an interlayer dielectric layer disposed between the plurality of data lines and the plurality of pixel electrodes.

4. An array substrate, comprising:
   a substrate;
   a plurality of data lines, the plurality of data lines being disposed on the substrate, and the plurality of data lines comprising a first data line and a second data line; and
   a plurality of pixel electrodes, the plurality of pixel electrodes being disposed on the plurality of data lines, the data lines being alternately disposed with the pixel electrodes, and the plurality of pixel electrodes comprising a blue pixel electrode and a non-blue pixel electrode;
   wherein the first data line is electrically connected to the blue pixel electrode, the second data line is electrically connected to the non-blue pixel electrode;
   wherein a first horizontal distance is defined as a distance between the blue pixel electrode and the first data line electrically connected thereto, and a second horizontal distance is defined as a distance between the non-blue pixel electrode and an adjacent data line or a distance between the blue pixel electrode and an adjacent second data line; and the first horizontal distance is greater than the second horizontal distance; and
   wherein a difference between the first horizontal distance and the second horizontal distance is between 0.1 µm and 1 µm.

5. The array substrate according to claim 4, wherein a material of the data line comprises one of metal, metal alloy or metal oxide.

6. The array substrate according to claim 4, wherein the array substrate further comprises an interlayer dielectric layer, and the interlayer dielectric layer is disposed between the plurality of data lines and the plurality of pixel electrodes.

7. A display panel comprising an array substrate, a color filter substrate, and liquid crystal disposed between the array substrate and the color filter substrate, the array substrate comprising:
   a substrate;
   a plurality of data lines, the plurality of data lines disposed on the substrate, and the plurality of data lines comprising a first data line and a second data line; and
   a plurality of pixel electrodes, the plurality of pixel electrodes disposed on the plurality of data lines, the data lines alternately disposed with the pixel electrodes, and the plurality of pixel electrodes comprising a blue pixel electrode and a non-blue pixel electrode;

wherein the first data line is electrically connected to the blue pixel electrode, the second data line is electrically connected to the non-blue pixel electrode;

wherein a first horizontal distance is defined as a distance between the blue pixel electrode and the first data line electrically connected thereto, and a second horizontal distance is defined as a distance between the non-blue pixel electrode and an adjacent data line or a distance between the blue pixel electrode and an adjacent second data line; and the first horizontal distance is greater than the second horizontal distance; and wherein a difference between the first horizontal distance and the second horizontal distance is between 0.1 µm and 1 µm.

8. The display panel according to claim 7, wherein the non-blue pixel electrode is a red pixel electrode or a green pixel electrode, the plurality of data lines further comprises a third data line, and the second data line is electrically connected to one of the red pixel electrode or the green pixel electrode, and the third data line is electrically connected to another one of the green pixel electrode or the red pixel electrode.

9. The display panel according to claim 7, wherein a material of the data line comprises one of metal, metal alloy or metal oxide.

10. The display panel according to claim 7, wherein the array substrate further comprises an interlayer dielectric layer, and the interlayer dielectric layer is disposed between the plurality of data lines and the plurality of pixel electrodes.

* * * * *